United States Patent

[11] 3,627,257

[72] Inventor Harald Stampfli
 Petit-Saconnex, Switzerland
[21] Appl. No. 881,167
[22] Filed Dec. 1, 1969
[45] Patented Dec. 14, 1971
[73] Assignee Lucifer S.A. Chemin Lucifer
 Carouge-Geneva, Switzerland
[32] Priority Dec. 23, 1968
[33] Switzerland
[31] 19127/68

[54] ELECTROMAGNETICALLY CONTROLLED FLUID-OPERATING VALVE
 1 Claim, 1 Drawing Fig.
[52] U.S. Cl. .................................................. 251/129, 251/282
[51] Int. Cl. ......................................................... F16k 31/06
[50] Field of Search ............................................ 251/129, 282

[56] References Cited
UNITED STATES PATENTS

| | | | |
|---|---|---|---|
| 2,331,503 | 10/1943 | Ray .................................. | 251/129 X |
| 3,194,499 | 7/1965 | Noakes et al. ................... | 251/282 X |
| 3,319,649 | 5/1967 | Cummins ......................... | 251/129 X |
| 3,214,134 | 10/1965 | Noakes et al. ................... | 251/282 |
| 3,441,246 | 4/1969 | Lauppe et al. .................... | 251/129 X |

Primary Examiner—Arnold Rosenthal
Attorneys—Emory L. Groff and Emory L. Groff, Jr.

ABSTRACT: A fluid-operating valve, wherein a magnetically controlled core shifts a flap valve between its operative and inoperative positions. The side of the flap valve facing the channel in which it is seated communicates with the opposite side through ports opening inside a closed bellows-shaped chamber extending coaxially with the flap valve and the average diameter of which registers with that of the seat of the flap valve.

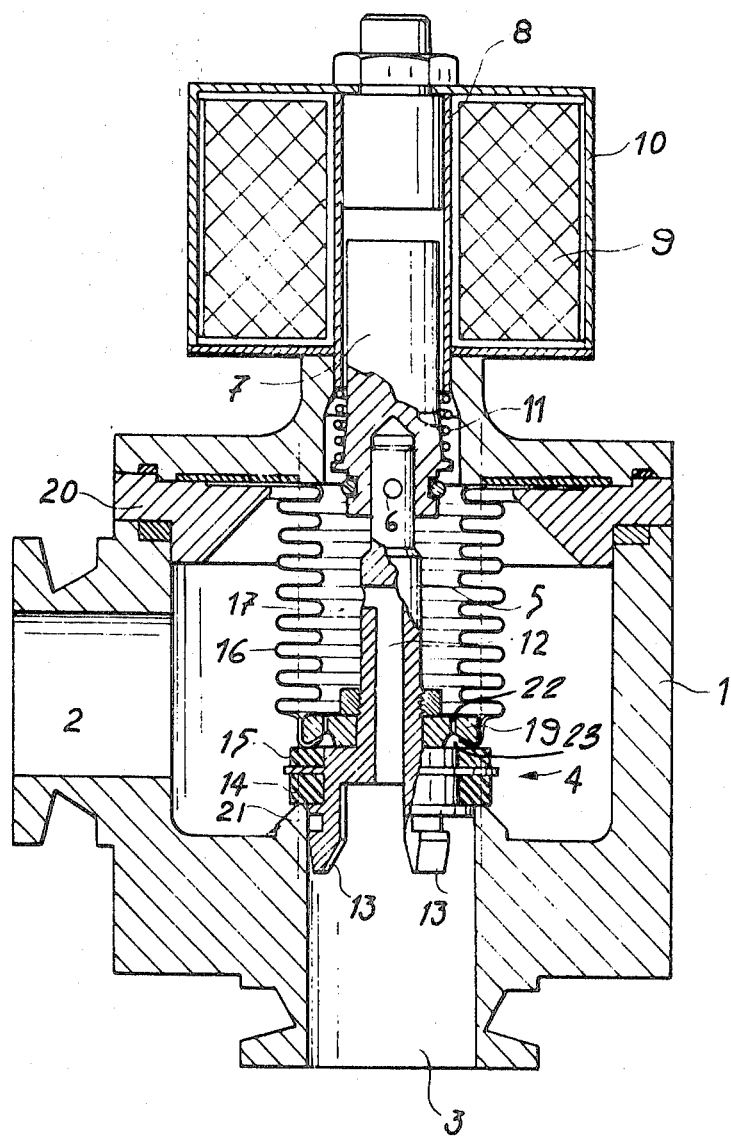

ELECTROMAGNETICALLY CONTROLLED FLUID-OPERATING VALVE

The present invention has for its object an electromagnetically controlled fluid-operating valve of the type including a flap valve connected mechanically with a magnetic core adapted to move under the action of a magnetic field, said valve cooperating with a seat for opening and closing, as required, a passageway for the fluid in accordance with the position assumed by the core. Such a valve also includes pressure-compensating means defining a chamber extending above said flap valve so as to balance the forces acting on the opposite sides of the flap valve. One wall of said chamber comprises a bellows-shaped tube fluidtightly connecting said flap valve with the valve body. In all known valves of this type, the compensation of the forces produced by the pressure of fluid on the flap valve are not obtained to a sufficient extent so that the electric power required for ensuring a proper operation of the valve is comparatively high. If the resultant of the forces exerted on the flap by the fluid pressure were zero, the force to be applied to the flap would be very small since it would be sufficient to overcome frictional forces which may be reduced to a very low level and to exert on the flap valve the force required for ensuring fluidtightness between the latter and its seat.

The present invention has for its object to obtain as closely as possible such ideal conditions in a valve of the type described.

It has for further and more specific object a valve of the type referred to, wherein the axis of the bellows-shaped tube is aligned with the axis of the valve seat while the average diameter of sad bellows-shaped tube is substantially equal to that of the seat.

The accompanying drawing illustrates diagrammatically and by way of example a preferred embodiment of said invention. The single FIG. of said drawing is a longitudinal cross section of the electromagnetically controlled fluid-operated valve.

As shown, the valve includes a body 1 provided with a fluid input channel 2 and with a fluid output channel 3. It also includes a flap valve 4, connected to a rod 5, said rod being connected by means of a pin 6 with a movable ferromagnetic core 7 sliding inside the tube 8.

The movable core 7 is surrounded by an electric winding 9 enclosed by a cap 10 and is urged into the position illustrated by a spring 11. The flap valve 4 is provided with an axial longitudinal blind bore 12 which extends inside the rod 5 and opens at its end into two diametrically opposed radial output ports along the periphery of said rod.

The lower end of the flap valve terminates with three guiding projections 13 fitted within the bored output channel 3 during the movements of the flap valve, whereby the latter is accurately guided.

The flap valve 4 is further more provided with two fluidtight packings 14 and 15 made of an elastomeric material such as that of the known type sold under the registered trademark "Viton." A bellows-shaped tube 16 which is connected in a fluidtight manner to the upper end of the flap valve 4 and to the upper portion of valve body 1, surrounds the rod 5 carrying said flap valve and defines a chamber 17 extending above the flap valve.

The lower end of the bellows-shaped tube 16 is clamped over the packing 15 by means of an intermediate ring 19 fitted along a circular line of a diameter corresponding to that of the seat. The upper end of said bellows-shaped tube is secured to the body 1 of the valve by means of a bearing plate 20. The axis of the bellows-shaped tube 16 is in alignment with the axis of the valve seat 21 and the average diameter of said tube 16 is substantially equal to that of the seat.

The bellows-shaped tube is preferably made of stainless steel when the valve is used as a vacuum-controlling valve. For other purposes it may be made for instance of a bronze and beryllium alloy.

In the position illustrated, the core 7 is in its lowermost position and the flap valve 4 engages its seat 21 so that no connection is established between the input and output channels 2 and 3.

When the valve is in its open position, the core 7 draws the rod 5 upwardly together with the flap valve 4 so that a connection is established between the channels 2 and 3.

The fluid pressure prevailing in the channel 3 underneath the flap valve is transmitted through the longitudinal bore 12 to the upper chamber 17 defined by the bellows-shaped tube 16. It is apparent that this provides a complete balance between the pressures inside the chamber 17 and in the channel 3, which pressures act on the opposite surfaces of the flap valve 4. Thus the control of the valve requires only a reduced power which is just sufficient for overcoming the reduced force of the spring 11 ensuring fluidtightness between the packing 14 and the seat 21.

By reason of the balanced flap valve thus described, said valve has the advantage of being possibly used for flow of the fluid in either direction as required.

The intermediate ring 19 is provided preferably with a longitudinal discharge port 22 in order to ensure a speedy balance between the pressures inside the chamber 17 and the annular space or channel 23 extending between the ring 19 and the flap valve 4.

What is claimed is:

1. An electromagnetically operated valve assembly for controlling the flow of a fluid through a body including an inlet opening, an outlet opening and a main chamber therebetween, said assembly comprising a flap valve member including a rod disposed substantially with said chamber, a movable magnetic core within said body, an electromagnet surrounding a portion of said magnetic core, means connecting said valve rod to said magnetic core, a valve seat adjacent said outlet opening and engageable by said valve member to control the passage of fluid through said main chamber, resilient means normally urging said valve member against said valve seat, a bellows-shaped chamber within said main chamber, the mean diameter of said bellows-shaped chamber being substantially equal to the means diameter of said seat, said bellows-shaped chamber surrounding a portion of said rod, a clamping ring at the lower end of said bellows-shaped chamber, said clamping ring including an annular channel on its lower surface, the lower outer edge of said clamping ring disposed in sealing engagement with the top surface of said valve member, an opening in said clamping ring communicating with said bellows-shaped chamber and said annular channel, said rod having a longitudinal bore therein communicating with said bellows-shaped chamber and communicating with said main chamber when said valve is in open position, whereby when said electromagnet is energized said magnetic core and said valve member are moved away from said valve seat to permit the flow of fluid through the main chamber of said body, the fluid pressure prevailing in said main chamber beneath said valve member causing a portion of said fluid to flow through the longitudinal bore in said rod into said bellows-shaped chamber and into the annular channel in said clamping ring thereby providing a balance between the pressures in said last-mentioned chamber and said outlet opening which pressures act on the opposite surfaces of said valve member.

* * * * *